US005525795A

United States Patent [19]

MacGregor et al.

[11] Patent Number: 5,525,795
[45] Date of Patent: Jun. 11, 1996

[54] VOLTAGE PROTECTION FOR ADD IN CARDS WITH SIDESWIPE CONTACTS

[75] Inventors: Duncan D. MacGregor, Shingle Springs; David C. Scheer, Pollock Pines; Neal E. Broadbent, El Dorado Hills, all of Calif.

[73] Assignee: Intel Corporation, Santa Clara, Calif.

[21] Appl. No.: 248,382

[22] Filed: May 24, 1994

[51] Int. Cl.[6] .............................. H01R 13/62; G01D 5/34

[52] U.S. Cl. ....................... 250/222.1; 361/801; 439/135; 250/229

[58] Field of Search ................................ 250/221, 222.1, 250/229; 439/64, 325, 327, 347, 135, 136, 137, 140, 146, 159; 361/736, 737, 740, 741, 796, 799, 801, 802, 803

[56] References Cited

U.S. PATENT DOCUMENTS

| | | | |
|---|---|---|---|
| Re. 34,369 | 9/1993 | Darden et al. . | |
| 4,017,770 | 4/1977 | Valfre | 361/399 |
| 4,530,069 | 7/1985 | Desrochers . | |
| 4,593,192 | 6/1986 | Slattery et al. | 250/229 |
| 4,695,925 | 9/1987 | Kodai et al. . | |
| 4,811,165 | 3/1989 | Currier et al. . | |
| 4,951,280 | 8/1990 | McCool et al. . | |
| 5,152,697 | 10/1992 | Abe et al. | 439/152 |
| 5,183,404 | 2/1993 | Aldous et al. . | |
| 5,184,282 | 2/1993 | Kaneda et al. . | |
| 5,196,712 | 3/1993 | Nguyen et al. | 250/551 |
| 5,207,586 | 5/1993 | MacGregor et al. . | |
| 5,272,477 | 12/1993 | Tashima et al. . | |
| 5,285,057 | 2/1994 | Murohara . | |
| 5,296,692 | 3/1994 | Shino . | |
| 5,296,850 | 3/1994 | King . | |
| 5,303,121 | 4/1994 | Thornberg . | |
| 5,313,364 | 5/1994 | Omori et al. . | |
| 5,373,133 | 12/1994 | Brockway et al. | 361/759 X |
| 5,427,534 | 6/1995 | Spickler et al. | 439/64 |
| 5,440,449 | 8/1995 | Scheer | 361/686 |

OTHER PUBLICATIONS

No author, *PCMCIA, Personal Computer Memory Card International Association PC Card Standard, Release 2.0*, 3–13 through 3–26 (Sep. 1991).

No author, *PCMCIA Recommended Extensions, Release 1.00*, 1–3 through 1–8 (1992).

*Primary Examiner*—Edward P. Westin
*Assistant Examiner*—John R. Lee
*Attorney, Agent, or Firm*—Blakely, Sokoloff, Taylor & Zafman

[57] ABSTRACT

A sideswipe contact system for an add in PC card consisting of an apparatus for identifying the card as having a sideswipe connector and apparatus on a header for causing the header connectors to be electrically isolated from an inserted PC card unless the PC card is equipped with the sideswipe connectors. The header assembly includes a frame mechanically shaped to receive the card frame in an inserting relationship. A plurality of connector assemblies are movably mounted to the header frame. Each of the connector assemblies consists of an insulating standoff having substantially the same specified shape as the first cavity and fitting therein and a second electrical conductor adjacent to and smaller than the standoff. The plurality of connector assemblies are movable from a first position when the PC card is not inserted in the header frame to a second position when the card is fully inserted into the header. The movement from the first position to the second position is in a direction substantially orthogonal to the long dimension of the PC card. When the plurality of connectors assemblies are in the second position, each connector assembly fits into a matching connector receptacle and the first and second electrical conductors are in electrical contact. The plurality of connector assemblies move to a third position intermediate between the first and second positions if a PC card not having the plurality of connector receptacles is inserted into the header frame.

11 Claims, 8 Drawing Sheets

VOLTAGE PROTECTION FOR ADD IN CARDS WITH SIDESWIPE CONTACTS

CROSS REFERENCE TO RELATEDAPPLICATIONS

Please refer to co-pending application Ser. No. 08/009,135 filed on Jan. 26, 1993 by Scheer, entitled METHOD AND APPARATUS FOR PROPAGATING SIGNALS ON INTEGRATED CIRCUIT CARDS.

BACKGROUND OF THE INVENTION

1. Field of the Invention

The subject invention relates to printed circuit cards for add in functions for computer based systems. More particularly, the invention relates to improved configurations for sideswipe contacts on printed circuit cards that improve safety and utility.

2. Description of the Prior Art

The PCMCIA (Personal Computer Memory Card International Association) standard was developed to provide user installed memory and I/O functions for small form factor digital computer systems. The standard specifies a card containing a printed circuit board. This product is usually referred to as a PCMCIA card or a PC card. There are three card formats: Types I, II and III. All three have external dimensions of 54 millimeters by 85.6 millimeters. Thicknesses vary. Type I is 3.3 millimeters thick. Type II is 5 millimeters thick and Type III is 10.5 millimeters thick. The standard specifies a 68 pin connector on one end. The 68 pin connector plugs into a mating connector mounted on a header which is in turn mounted to a mother board or daughter board located inside the host. The header is U shaped with the 68 pins at the base of the U. There is a wide variation of headers including headers for different thickness cards; however, the 68 pin connector is common to all PCMCIA cards.

The PCMCIA standard specifies the function of each of the 68 pins in the connector and supports either an 8 bit or 16 bit bus. There are four ground pins, two power pins and up to 3 free signal pins for additional functions.

The original PCMCIA cards were for memory addition and thus had no interaction with external devices. I/O cards were developed later to add functions such as modems, faxes, network interfaces, multi-media interfaces and sound cards. In order to handle I/O functions, a second connector was needed. However, this can only be done in a way that does not sacrifice backward compatibility. This means for example that the physical form factor cannot change and the 68 pin connector must be retained and in precisely the same location that it now commands.

By virtue of the small size of the cards, there were no standard I/O connectors or cables that were suitable. In order to solve that problem, the manufacturers of PCMCIA cards developed custom connectors and cables that mate with the card. Because they are small, it is difficult to make them robust. Because they are non-standard, they are more expensive and not readily available.

The patent application referenced in the first section, METHOD AND APPARATUS FOR PROPAGATING SIGNALS IN IC CARDS, presents a solution to the external cable problem. Rather than having a custom I/O connector on the end of the card, a "sideswipe" approach puts contacts on the side of the card. Contacts can be on one or both sides of the card. To do this, the header that the card plugs into is designed to have contacts that pick up the contacts on the side of the card when the card plugs into the host computer. The mother board in the host picks up the connections from the header and internally wires them to the back or side of the host computer where there is enough room for standard I/O connectors. Thus, the user need only plug in the card. There is no cable to forget or break.

However, there are problems with the sideswipe solution. A first problem relates to the isolation of electrical signals. That is, electrical signals on the sideswipe contact must be isolated from the chassis ground of the host computer. This is both for human safety and to protect the host hardware. For example, suppose that there is a non-sideswipe card plugged into a sideswipe header inside a host which is in turn connected to a telephone line. In order to ring a telephone, signals called tip and ring are put on the line, and these signals are about 150 volts. In addition, if lightning were to strike nearby, a very high voltage spike could appear on the phone line. Thus, provision must be made in the design of the add in PC card system so that such voltages do not appear on the system chassis.

The sideswipe concept as described in the Scheer application has contacts like a leaf spring which wipe the side of the card. If the side of the card is metal, the contacts would be in contact with the ground of the chassis. And such cards are on the market.

A second problem relates to dangers from not having the PC card fully inserted. If this happens, the first contact on the card would make contact with the next to last contact on the header, or even some other contact. In this case, there could be a host computer circuit and external signal mismatch. For example, a tip and ring signal could end up on a logic line. If this happened, much of the circuitry in the host would likely be destroyed.

SUMMARY OF THE INVENTION

It is therefore an object of the invention to provide an apparatus that detects the presence of a sideswipe card as it is being inserted.

It is another object of the invention to provide an apparatus that prevents the contacts in the header from contacting the side of the add in PC card unless a sideswipe type add in PC card is present.

It is yet another object of the invention to protect the host computer and user from high voltage spikes because the chassis ground is not isolated from the system ground.

It is yet another object of the invention to protect the host computer from a mismatch of an external signal and the host circuitry resulting from the PC card being not completely inserted.

These and other objects of the invention may be achieved in an improved add in PC card sideswipe connector system. The basic PC card add in system consists of a card having a substantially rectangular top view with a long and short dimension and including a printed circuit board surrounded and supported by a frame, a first connector mounted to the frame along one of the short dimensions and electrically connected to the printed circuit board and a second connector consisting of one or more electrical contacts mechanically mounted to the frame along at least one of the long dimensions, each being electrically connected to the printed circuit board. In addition, the basic PC card add in system includes a header assembly which is electrically and mechanically connected to the host computer and is mechanically shaped to receive the PC card in an inserting relationship and includes a third connector therein which is electrically connected to the host computer and adapted to mate with the first connector socket in the card, a fourth connector located on the header so as to mate with the second connector on the PC card. The improvement comprises means associated with the add in PC card for identifying the card as having the second connector; and means associated with the header for causing the forth connector to be electrically isolated from an inserted PC card unless the PC card is equipped with the second connector. The detection function may be accomplished mechanically, magnetically or optically. A preferred embodiment is mechanical. It comprises a plurality of connector receptacles in the long dimension of the frame of the card each consisting of: a first cavity having a specified shape and a second cavity adjacent to and smaller than the first cavity and a first electrical conductor positioned in the second cavity inside of the plane of the outer edge of the frame and electrically connected to the printed circuit board. A header assembly is located in the host computer. The header assembly includes a frame mechanically shaped to receive the card frame in an inserting relationship. A plurality of connector assemblies are movably mounted to the header frame. Each of the connector assemblies consists of an insulating standoff having substantially the same specified shape as the first cavity and fitting therein and a second electrical conductor adjacent to and smaller than the standoff. The connector is electrically connected to the host computer. The plurality of connector assemblies are movable from a first position when the PC card is not inserted in the header frame to a second position when the card is fully inserted into the header. The movement from the first position to the second position is in a direction substantially orthogonal to the long dimension of the PC card. When the plurality of connectors assemblies are in the second position, each connector assembly fits into a matching connector receptacle and the first and second electrical conductors are in electrical contact. The plurality of connector assemblies move to a third position intermediate between the first and second positions if a PC card not having the plurality of connector receptacles is inserted into the header frame.

BRIEF DESCRIPTION OF THE DRAWING

The invention will now be described in detail in conjunction with the drawing in which.

DETAILED DESCRIPTION OF THE PREFERRED EMBODIMENT

Figure 1:
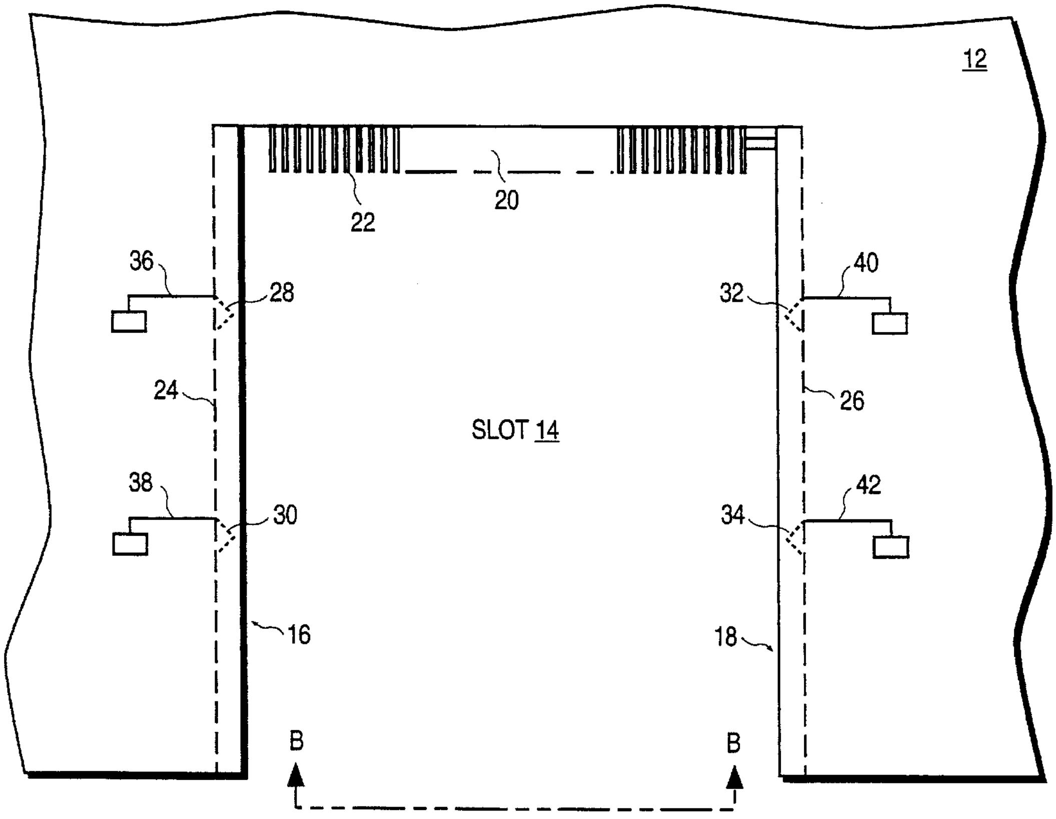
FIG. 1 (PRIOR ART)
FIG. 1 is a top view of a prior art add in card slot in a host computer that is equipped with sideswipe contacts.
Figure 2:
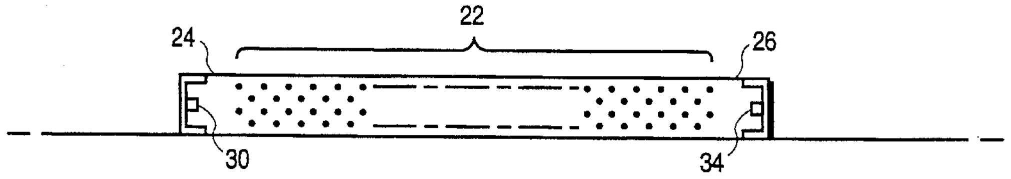
FIG. 2 is an end view of the add in card slot of FIG. 1.
Figure 3:
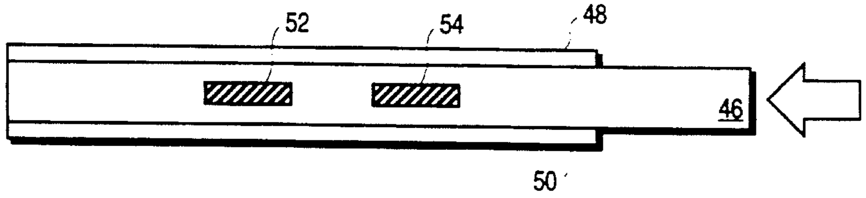
FIG. 3 is a side view of an add in card having sideswipe contacts and designed to fit into the card slot of FIG. 1.

An important aspect of the present invention is the recognition of the problems created by a non-sideswipe PC card being inserted into a host computer equipped with a slot for sideswipe PC cards. FIGS. 1, 2 and 3 illustrate the prior art and its problems.

FIG. 1 is a top view of an add in card slot in a host computer that is equipped with sideswipe contacts. Referring now to FIG. 1, a mother board or daughter board 12 has an opening or slot 14. Slot 14 is defined by long dimensions 16 and 18 and by short dimension 20 of mother board 12. A 68 pin connector 22 is positioned along short dimension 20 and electrically connected to mother board 12. Long dimensions 16 and 18 each contain channels as illustrated by lines 24 and 26 respectively. Within channels 24 and 26 are sideswipe connectors 28 through 34 which are connected via conductive signal leads 36 through 42 to mother board 12.

FIG. 2 is an end view of slot 14 which more clearly shows the positioning of sideswipe connectors 30 and 34 in channels 24 and 26.

FIG. 3 is a side view of a prior art add in PC card having sideswipe contacts. Referring now to FIG. 3, PC card 44 includes a frame 46 which surrounds and supports a printed circuit board (not shown). A top cover 48 and a bottom cover 50 are bonded to frame 46. Sideswipe contacts 52 and 54 are flat conductive surfaces mechanically mounted in or near the plane of the outer surface of frame 46 and electrically connected to the printed circuit board of the PC card. Contacts 52 and 54 are positioned to make contact with sideswipe connectors 28 and 30 in FIG. 1 when card 44 is fully inserted into slot 14. Frame 44 fits into and slides with respect to channels 24 and 26.

As can be seen best from FIG. 2, if a PC card of any type, sideswipe or non-sideswipe, is inserted into slot 14, sideswipe connectors 28 through 34 will scrape along frame 46. If frame 46 is metal, as many are, the chassis ground is connected directly to the sideswipe circuitry. If the frame is painted, particles of paint may rub off and foul connectors 28 through 34.

These problems are generally avoided by the present invention which in its broadest conceptualization provides for a means of distinguishing between sideswipe and non-sideswipe PC cards as the card is inserted into the host and preventing electrical contact between the PC card and the host in the sideswipe area unless a sideswipe card is inserted.

Figure 4:
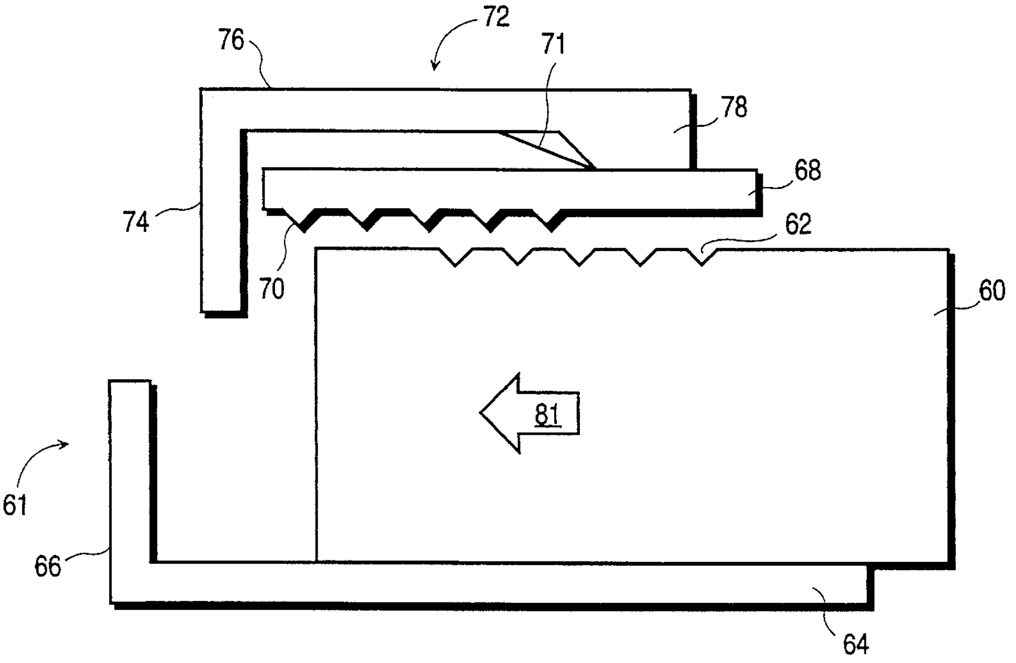
FIG. 4 is a top view of a sideswipe connector system according the present invention in a partially inserted position.

FIG. 4 is a top view of a preferred embodiment of the present invention. It is a complete contact system consisting of both the PC card with sideswipe contacts and a header assembly into which the PC card fits. The header assembly is mechanically and electrically connected to the host computer. Referring now to FIG. 4, PC card 60 is shown partially inserted into header assembly 61. PC card 60 contains sideswipe contacts 62 along one of its long dimensions. The invention contemplates having sideswipe contacts on one or both long dimensions. A header frame member 64 is an L-shaped structural part of header assembly 61 that mechanically defines a portion the slot into which card 60 is inserted. Frame member 64 has a base portion 66.

Contact block 68 is an electrically insulating member of rectangular cross section that provides mechanical support for sideswipe contact assemblies 70. Sideswipe contact assemblies 70 are electrically connected to the host computer. A spring member 71 is attached to contact support block 68.

Slide block 72 is a mechanical part having an L-shaped cross section and having a base portion 74 and an arm portion 76. Arm 76 has a boss 78 on the end opposite that of base portion 74. Arm portion 76 is fitted into a channel in the header assembly (not shown) and is movable with respect thereto. Slide block 72 is spring loaded to header assembly 61 such that its position when PC card 60 is not completely inserted is away from the plane of base portion 66 of header base member 64.

In operation, PC card 60 is inserted into the slot in header 61 in the direction of arrow 81. As PC card 60 is pushed in, it comes in contact with base portion 74 of slide block 72. As card 60 is pushed in further, it causes slide block 72 to move with it until card 60 comes in contact with base portion 66 of frame member 64. At this point, card 60 is fully inserted into header 61.

As slide block 72 is pushed in by card 60, it engages spring member 71 attached to contact support block 68. Spring member 71 is angled such that boss 78 of slide block 72 rides up on spring member 71 and thereby pushes contact support block 68 orthogonally towards the edge of PC card 60. As contact support block 68 moves toward PC card 60, sideswipe contact assemblies 70 engage PC card contacts 62 when card 60 is fully inserted. Sideswipe contact assemblies 70 are angled so that they can properly seat with card contacts 62 as card 60 is being inserted. Spring member 71 is sufficiently rigid that when boss 78 rides up on it, it deforms only a small amount. When card 60 is fully inserted and sideswipe contact assemblies 70 have made contact with card contacts 62, spring member 71 is deformed only enough to exert a force on contact support block 68 and thereby maintain positive electrical contact between card 60 and header assembly 61.

Figure 5:
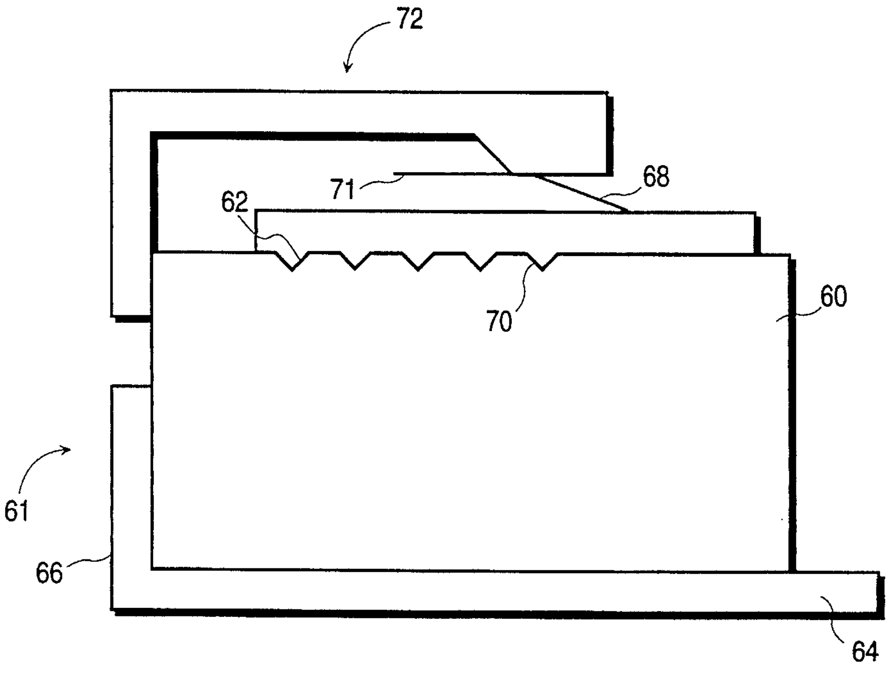
FIG. 5 is a top view of a sideswipe connector system according the present invention in a fully inserted position.

FIG. 5 shows a top view of the contact system of FIG. 4 with PC card 60 fully inserted into header assembly 61.

As PC card 60 is removed, slide block 72 moves along therewith since slide block is spring loaded to cause such movement. This movement of slide block 72 allows contact support block 68 to translate away from PC card and thereby disengage sideswipe contact assemblies 70.

Figure 6:
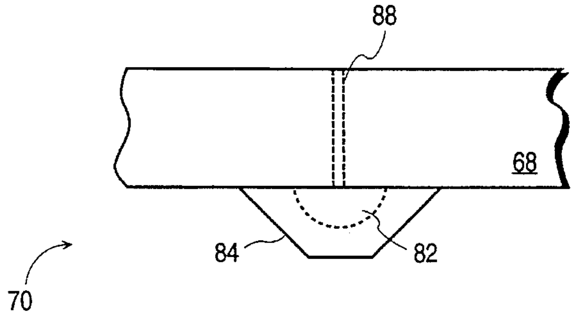
FIG. 6 is a top view of a contact assembly made according to the present invention.
Figure 7:
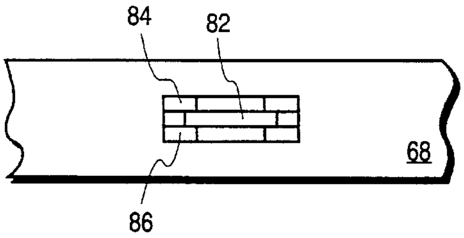
FIG. 7 is a front view of the contact assembly made of FIG. 6.

FIG. 6 is an enlarged top view of sideswipe contact assembly 70, and FIG. 7 is an enlarged of front view of sideswipe contact assembly 70. Referring now to FIGS. 6 and 7, contact assembly 70 is a sandwich arrangement of an electrically conducting contact 82 between top standoff 84 and bottom standoff 86. Electrical conductor 82 is mounted on contact support block 68. Electrical signal lead 88 passes through contact support block 68 and electrically connects contact 82 with the remainder of header assembly 61 and ultimately to the host computer and the outside world. Conductor 82 is recessed from all external surfaces of standoffs 84 and 86. Thus, it is impossible for conductor 82 to come in contact with any portion of a PC card that is not specially designed to accommodate standoffs 84 and 86. Standoffs 84 and 86 would typically be fabricated in a molding process from an insulating organic material such as a polycarbonate. Contact 82 and lead 88 would typically be stamped form a metal such as phosphor bronze. Contact 82 may then be coated with a non-corrosive and highly conductive metal such as gold. Contact and 82 and lead 88 would typically be molded into the configuration as shown in FIGS. 6 and 7. The distance between the end of standoffs 84 and 86 and contact 82 should be at least 0.030 inches to insure complete electrical isolation in telephony applications.

Figure 8:
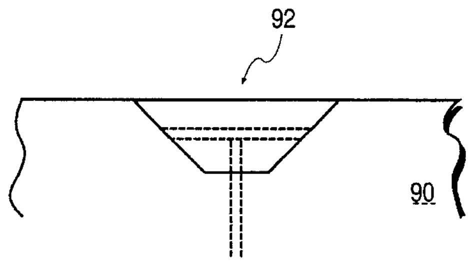
FIG. 8 is a top view of a contact receptacle made according to the present invention.
Figure 9:
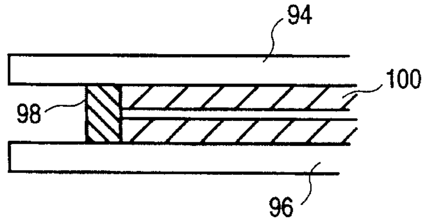
FIG. 9 is a front view of the contact receptacle of FIG. 8.

FIG. 8 is an enlarged top view of a contact receptacle 62 on PC card 60, and FIG. 9 is an enlarged side view of a contact receptacle 62. Referring now to FIGS. 8 and 9, frame 90 of PC card 60 contains a pyramidal shaped receptacle 92. Receptacle 92 consist of top and bottom openings 94 and 96 having the same form factor as standoffs 84 and 86 of FIGS. 6 and 7. Electrical conductor 98 is positioned on the end of an insulating header 100 which protrudes partially into receptacle 92. Electric lead 102 connects conductor 98 with the electronics of PC card 61.

In operation, when PC card 60 is fully inserted, connector assemblies 70 fit completely into contact receptacles 62. This can occur since standoffs 84 and 86 fit into top and bottom openings 94 and 96. This in turn allows electrical contact 82 in sideswipe contact assembly 70 and electrical contact 98 in contact receptacle 62 to touch and make a positive electrical connection.

Figure 10:
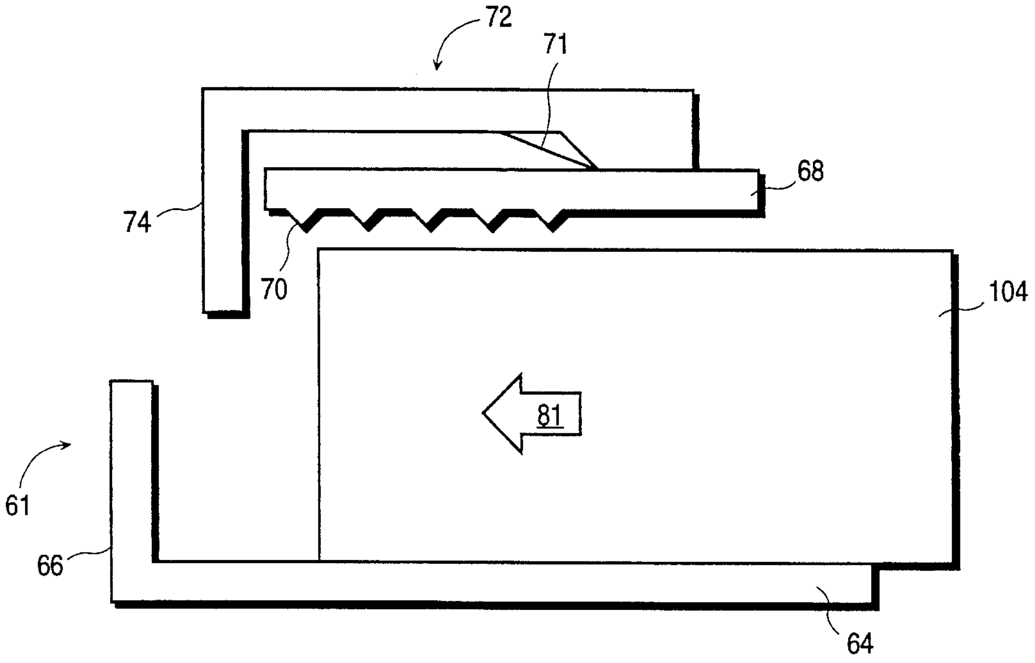
FIG. 10 is a top view of a non-sideswipe card partially inserted into header assembly made according to the present invention.
Figure 11:
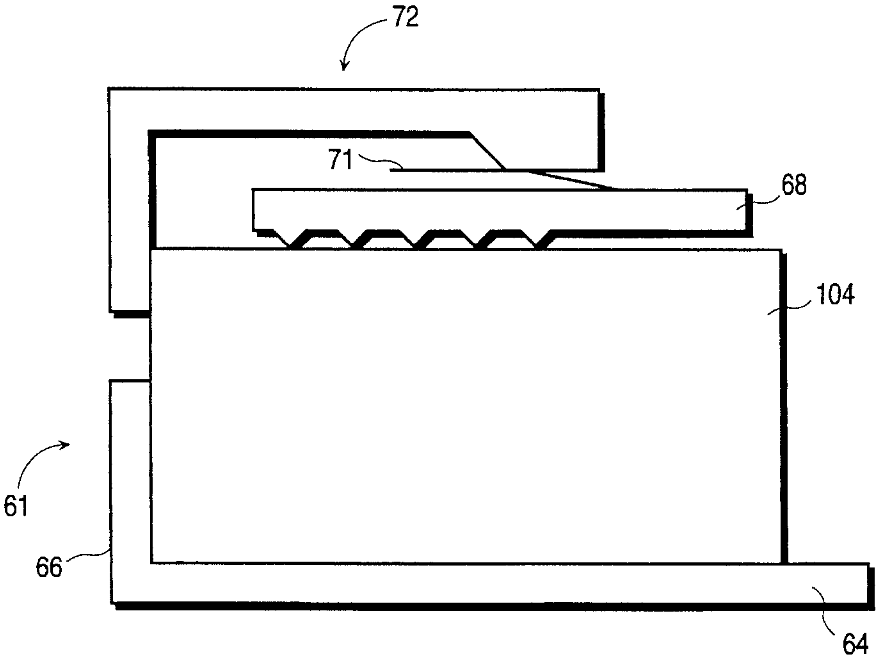
FIG. 11 is a top view of a non-sideswipe card fully inserted into header assembly made according to the present invention.

FIG. 10 is a top view of a non-sideswipe card in partially inserted into header assembly 61, and FIG. 11 is a top view of non-sideswipe card in fully inserted into header assembly 61. In operation non-sideswipe PC card 104 is inserted into the slot in header 61 in the direction of arrow 81. As non-sideswipe PC card 104 is pushed in, it comes in contact with base portion 74 of slide block 72. As non-sideswipe PC card 104 is pushed in further, it causes slide block 72 to move with it until non-sideswipe PC card 104 comes in contact with base portion 66 of frame member 64. At this point, non-sideswipe PC card 104 is fully inserted.

As slide block 72 is pushed in by non-sideswipe PC card 104, it engages spring member 71 attached to contact support block 68. As contact support block 68 moves downward, standoffs 84 and 86 of contact assembly 70 come in contact with the frame of non-sideswipe PC card 104. Since standoffs 84 and 86 are made of substantially non-deformable insulating materials, the movement of contact support block stops at this point. As boss 78 continues to move in, it deforms spring member 71 rather than riding up thereon as shown in FIG. 11. Standoffs 84 and 86 prevent contact 82 from making electrical contact with non-sideswipe PC card 104.

While the invention has shown the preferred embodiment based on mechanical principles of detection of the presence of a sideswipe card, it would be possible to create a system using an optical, magnetic or electrical detection scheme and an electric motor to move contact support block into position to have contact assemblies 70 mate with contact receptacles 62.

Figure 12:
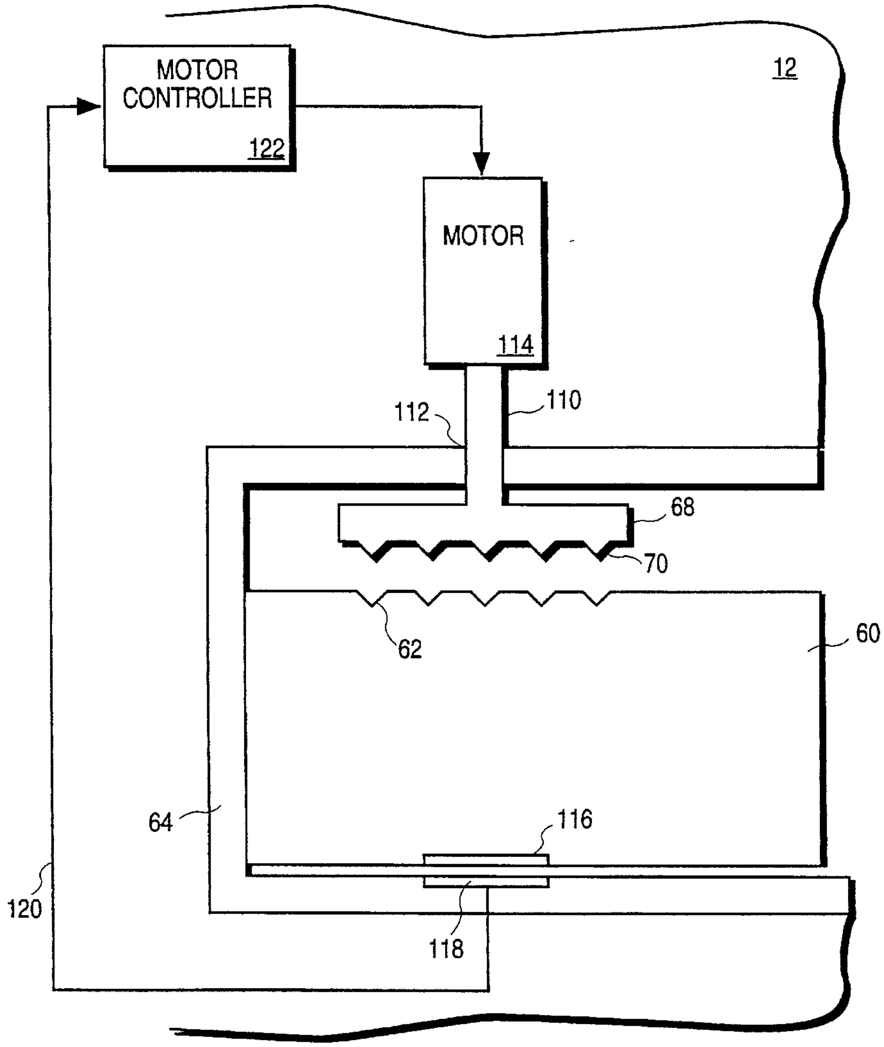
FIG. 12 is a cross-sectional view of a sideswipe connector system according to the present invention with an alternative sensor and actuator mechanism.

Referring now to FIG. 12, contact block 68 is mechanically fixed to rod 110 which passes through an annulus 112 in header frame member 64 and is attached to electric motor 114 which is mounted on mother board or daughter board 12. A magnetic strip 116 is positioned on a long edge of PC card 60. A magnetic strip detector 118 is positioned on the inner long dimension of header frame member 64 such that magnetic strip 116 is adjacent to detector 118 when PC card 60 abuts the short dimension of header frame member 64. Magnetic strip detector 118 is connected via lead 120 to the input to motor controller 122 and the output of motor controller 122 is connected to motor 114. Magnetic strip 116, magnetic strip detector 118, motor controller 122 and motor 114 are well known to those skilled in the art.

Figure 13:
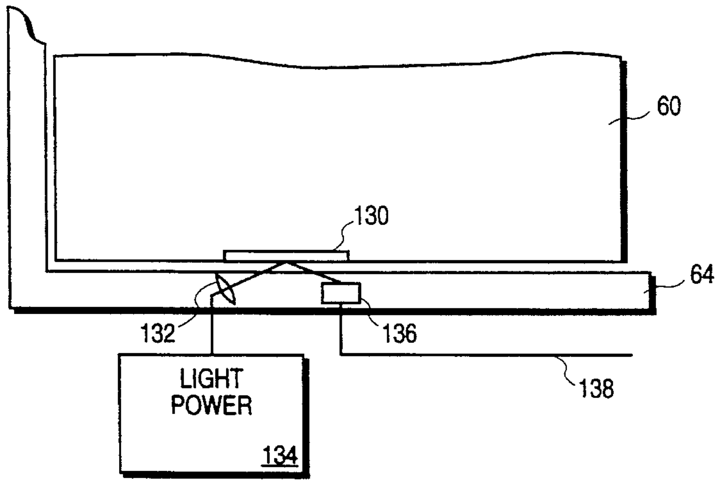
FIG. 13 is a cross-sectional view of an alternative detector arrangement.

FIG. 13 is a cross-sectional view of an alternative detector arrangement for the system of FIG. 12. Referring now to FIG. 13, an optical reflector 130 is positioned on a long edge of PC card 60. A light source 132 is positioned on the inner long dimension of header frame member 64 such that optical reflector 130 is adjacent when PC card 60 is inserted in slot 14. Light source 132 is connected to light power source 134 which is mounted on mother or daughter board 12 and provides the power to cause light source 132 to emit light. An optical detector 136 is positioned along inner long dimension of header frame member 64 such that light form light source 132 is reflected by light reflector 30 to light detector 136 when PC card 60 abuts the short dimension of header frame member 64. Light detector 136 is connected by lead 138 to motor controller 122 of FIG. 12.

In operation, detection of the insertion of PC card 60 either by the magnetic detector arrangement of FIG. 12 or the optical detector arrangement of FIG. 13 causes a detection signal to be supplied by either lead 120 or lead 138 to motor controller 122 which in turn controls the current being supplied to motor 114 and thereby moves rod 110 and contact block 68 such that contacts 70 on contact support block 68 move into contact with sideswipe contacts 62 on PC card 60. It will be appreciated that the preferred embodiment is subject to numerous adaptations and modifications without departing from the scope of the invention. Therefore, it is to be understood that, within the scope of the appended claims, the invention may be practiced other than as specifically described.

What is claimed is:

1. A connector system for an add in PC card for a host computer comprising in combination:

a substantially rectangular printed circuit board with a long and short dimension;

an electrically insulating card frame surrounding and supporting said printed circuit board along the edges thereof;

a first connector mounted to said frame along one of said short dimensions;

a plurality of connector receptacles in a long dimension of said frame each consisting of:

a first cavity in said frame, said first cavity having a specified shape;

a second cavity in said frame, said second cavity being adjacent to and smaller than said first cavity;

a first electrical conductor positioned in said second cavity inside of the plane of the outer edge of said frame and electrically connected to said printed circuit board;

a header frame having a long dimension and a short dimension and mechanically shaped to receive said card frame in an inserting relationship, said header frame being mechanically connected to said host computer;

a plurality of connector assemblies movably mounted to said header frame, said plurality of connector assemblies each comprising:

an insulating standoff having substantially the same specified shape as said first cavity and fitting therein;

a second electrical conductor adjacent to and smaller than said standoff, said connector being electrically connected to said host computer;

means connected to said header frame and to said plurality of connector assemblies for moving said plurality of connector assemblies from a first position when said PC card is not inserted in said header frame to a second position in which each connector assembly fits into a matching connector receptacle and said first and second electrical conductors are in electrical contact when said the short dimension of said card frame abuts the short dimension of said header frame, said means being further adapted to move said plurality of connector assemblies to a third position intermediate between said first and second positions if a PC card not having said plurality of connector receptacles is inserted into said header frame, said third position being such that the only portion of said header contacting said card is said standoff.

2. The connector system for an add in PC card for a host computer of claim 1 wherein said means for moving said plurality of connector assemblies comprises:

a contact support block having said connector assemblies mounted to one side thereof, said support block being connected to said header frame so as to be movable with respect thereto in a substantially orthogonal direction;

a spring member mounted to said contact support on the side opposite to said connector assemblies, said spring member extending outwardly from said contact support block at an oblique angle;

a slide block having a base and an arm, said arm having a boss on the end opposite to said base, said slide block being slidably mounted to said header base and adjacent to said contact support with said boss being in slidable contact with the side of said contact to which said spring member is attached and sliding in response to the motion of said card being inserted into said host computer such that said boss rides up on said spring member and causes said slide block to translate in an orthogonal direction until said standoffs make contact with said header assembly frame.

3. The connector system for an add in PC card for a host computer of claim 2 wherein said specified shape of said first cavity and said standoff is substantially pyramidal.

4. The connector system for an add in PC card for a host computer of claim 3 wherein said first and second cavities are contiguous to each other; and said standoff and said second electrical conductor are contiguous.

5. The connector system for an add in PC card for a host computer of claim 4 wherein said plurality of connector assemblies each comprises:

a first electrically insulating standoff;

a second electrically insulating standoff; and a second electrical conductor positioned between and bonded to said first and said standoffs and having a form factor smaller than said first and second standoffs, said connector being electrically connected to said host computer.

6. The connector system for an add in PC card for a host computer of claim 5 wherein said second conductor is smaller than said standoffs by at least 0.30 inches.

7. The connector system for an add in PC card for a host computer of claim 6 wherein said first and second standoffs and said contact support block are molded from a single piece of electrically insulating material.

8. The connector system for an add in PC card for a host computer of claim 7 wherein said insulating material is a polycarbonate.

9. The connector system for an add in PC card for a host computer of claim 7 further characterized by said PC card conforming to the PCMCIA standard.

10. The add in PC card system for a host computer of claim 1, wherein said means for moving said connector assemblies from a first position when said PC card is not inserted in said header frame in a direction substantially orthogonal to said long dimension of said PC card to a second position in which each connector assembly fits into a matching connector receptacle and said first and second electrical conductors are in electrical contact when said short dimension of said card frame abuts the short dimension of said header frame comprises:

a magnetic stripe positioned on said frame;

means for movably mounting said fourth connector means to said header;

a magnetic detector mounted to said header so as to detect the presence of said magnetic stripe; and electrical motor means mounted on said header and connected to said fourth connector and adapted to move said fourth connector into contact with said second connector when said magnetic detector detects the presence of said magnetic stripe.

11. The add in PC card system for a host computer of claim 1, wherein said means for moving said connector assemblies from a first position when said PC card is not inserted in said header frame in a direction substantially orthogonal to said long dimension of said PC card to a second position in which each connector assembly fits into a matching connector receptacle and said first and second electrical conductors are in electrical contact when said short dimension of said card frame abuts the short dimension of said header frame comprises:

an optical reflector mounted on said frame;

a source of light mounted on said header so as to cause a beam of light to fall upon said optical reflector when said PC card abuts the short dimension of said header; and an optical detector mounted to said header so as to detect the presence of light reflected from said optical reflector.

* * * * *